(12) United States Patent
Sandstrom

(10) Patent No.: US 6,391,945 B2
(45) Date of Patent: May 21, 2002

(54) RUBBER CONTAINING STARCH REINFORCEMENT AND TIRE HAVING COMPONENT THEREOF

(75) Inventor: Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/850,890

(22) Filed: May 8, 2001

Related U.S. Application Data

(62) Division of application No. 09/370,662, filed on Aug. 6, 1999, now Pat. No. 6,269,858.

(51) Int. Cl.⁷ .............................. C08J 5/10; C08L 3/00; C08L 89/00
(52) U.S. Cl. ........................... 524/47; 524/49; 524/492; 524/495
(58) Field of Search .............................. 524/47, 49, 52, 524/571, 575, 575.5, 579, 509, 511, 541, 492, 493, 494, 495, 496

(56) References Cited

U.S. PATENT DOCUMENTS

| | | | |
|---|---|---|---|
| 3,480,572 A | 11/1969 | Buchanan et al. | 260/172 |
| 4,605,696 A | 8/1986 | Benko et al. | 524/432 |
| 4,942,192 A | 7/1990 | Yasuda et al. | 524/44 |
| 5,023,292 A | 6/1991 | Hong et al. | 524/432 |
| 5,206,289 A | 4/1993 | Sinsky et al. | 525/110 |
| 5,672,639 A | 9/1997 | Corvasce et al. | 524/52 |
| 5,684,091 A | 11/1997 | Maly et al. | 525/332.5 |
| 5,886,074 A | 3/1999 | Sandstrom et al. | 524/291 |

FOREIGN PATENT DOCUMENTS

| | | | |
|---|---|---|---|
| EP | 0553678 | 8/1993 | C08L/21/00 |
| EP | 0795581 | 9/1997 | C08L/21/00 |
| EP | 1038697 | 9/2000 | B60C/1/00 |

*Primary Examiner*—James J. Seidleck
*Assistant Examiner*—U. K Rajguru
(74) *Attorney, Agent, or Firm*—Henry C. Young, Jr.

(57) ABSTRACT

The present invention relates to a rubber composition containing a combination of starch, modified starch and/or starch/plasticizer composite together with selected methylene donor and/or methylene acceptor compounds. The invention also relates to tires having at least one component comprised of such rubber composition. Such tire component can be, for example, its circumferential tread or other component of the tire.

20 Claims, No Drawings

RUBBER CONTAINING STARCH REINFORCEMENT AND TIRE HAVING COMPONENT THEREOF

This is a divisional of parent application Ser. No. 09/370, 662, filed on Aug. 6, 1999, now U.S. Pat. No. 6,269,858.

FIELD

The present invention relates to a rubber composition containing a combination of starch, modified starch and/or starch/plasticizer composite together with selected methylene donor and/or methylene acceptor compounds. The invention also relates to tires having at least one component comprised of such rubber composition. Such tire component can be, for example, its circumferential tread or other component of the tire.

BACKGROUND

Starch, modified starch and starch/plasticizer composites have sometimes been used in various compositions which might have included elastomer formulations, for various purposes which might have included tire components such as tire treads.

Such materials might be used alone or in conjunction with silica and/or carbon black reinforcing fillers or also with other fillers such as, for example, recycled, or ground, vulcanized rubber particles, short fibers, kaolin clay, mica, talc, titanium oxide and limestone. Such short fibers can be, for example, fibers of cellulose, aramid, nylon, polyester and carbon composition.

U.S. Pat. Nos. 5,403,923, 5,258,430, and 4,900,361 disclose the preparation and use of various starch compositions and U.S. Pat. No. 5,672,639 relates to use of starch/plasticizer composites in rubber compositions including as a tire component such as a tire tread.

However, use of starch-based fillers, in general, may present some limitations as reinforcement for various elastomers where resistance to abrasion and tear properties for elastomer composition are significantly desirable properties.

Accordingly, it is desired to enhance the use of starch-based materials in elastomer compositions.

Historically, starch may typically be represented as a carbohydrate polymer having repeating units of amylose (anhydroglucopyranose units joined by glucosidic bonds) and amylopectin, a branched chain structure, as is well known to those having skill in such art. Often, starch is composed of about 25 percent amylose and about 75 percent amylopectin. [*The Condensed Chemical Dictionary, Ninth Edition* (1977, revised by G. G. Hawley, published by Van Nostrand Reinhold Company, page 813]. Starch can be, reportedly, a reserve polysaccharide in plants such as, for example, corn, potatoes, rice and wheat as typical commercial sources.

Starch by itself typically has a softening point of about 200° C. or above and, therefore, usually is thought of as having a somewhat limited use in many rubber products, primarily because rubber compositions are normally processed by preliminarily blending rubber with various ingredients at temperatures in a range of about 140° C. to about 170° C., usually at least about 160° C., and sometimes up to 180° C. which is not a high enough temperature to cause the starch (with softening temperature of at least about 200° C.) to effectively melt and efficiently blend with the rubber composition. As a result, the starch particles tend to remain in individual domains, or granules, within the rubber composition rather than as a more homogeneous blend.

Accordingly, starch is sometimes modified with a plasticizer of lower softening point to create a starch/plasticizer composite for use in rubber compositions.

The term "phr" as used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber" and "rubber compound", where used herein, are used interchangeably to refer to "rubber which has been blended or mixed with various ingredients and materials" and such terms are well known to those having skill in the rubber mixing or rubber compounding art.

The term "carbon black" as used herein means "carbon blacks having properties typically used in the reinforcement of elastomers, particularly sulfur curable elastomers".

The term "silica" as used herein can relate to precipitated or fumed silica and typically relates to precipitated silica, including an aluminosilicate, which is well known to those having skill in such art.

A reference to an elastomer's Tg refers to its glass transition temperature, which can conveniently be determined by a differential scanning calorimeter at a heating rate of 10° C. per minute.

SUMMARY AND PRACTICE OF THE INVENTION

In accordance with one aspect of this invention, a rubber composition is provided which comprises (A) 100 parts by weight of at least one diene-based elastomer, (B) about 0.1 to about 120, alternatively about 25 to about 90, phr of at least one elastomer reinforcing filler composed of (1) about 0.1 to about 120, alternatively about 5 to about 70, phr of at least one starch-based material selected from at least one of starch, starch/plasticizer composite and modified starch, and (2) zero to about 90, alternatively about 20 to about 85, phr of (a) carbon black or silica, namely an amorphous silica or (b) carbon black and silica, namely an amorphous silica; and, optionally, at least one additional inorganic reinforcing or non-reinforcing filler, (C) optionally a coupler for said starch-based material and silica, if silica is used, where said coupler has a moiety reactive with the surface of said starch composite and the surface of said silica, as the case may be, and a moiety interactive with the said elastomer, and (D) a methylene acceptor and/or methylene donor exclusive of hexamethylene tetramine.

Preferably, said modified starch is selected from at least one of hydroxyethylated starch, oxidized starch and acid modified starch.

In practice, said starch is typically composed of amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer has a softening point in a range of about 110° C. to about 170° C. according to ASTM No. D1228.

In the practice of this invention it is preferred that the methylene donor compound contains an —CH$_2$OX group wherein X is an alkyl radical having from one to 8 carbon atoms, preferably selected from methyl, ethyl, propyl and octyl radicals and is exclusive of hexamethylene tetramine. For example, see U.S. Pat. No. 5,886,074.

Representative of such methylene donor compounds, exclusive of hexamethylene tetramine are, for example, hexamethoxymethylmelamine, hexaethoxymethylmelamine and ethoxymethylpyridinium chloride; and N-methylol derivatives of melamine such as, for example N,N',N"-trimethylolmelamine, N-methylolmelamine and N',N"-dimethhylolmelamine.

Representative of methylene acceptor compounds are, for example, phenolic cashew nut oil resins, resorcinol monobenzoate and polyhydric phenoxy resin, preferably phenolic cashew nut oil resin. for example, see U.S. Pat. Nos. 5,206,289 and 4,605,696.

Such phenolic cashew nut oil resins may be available, for example, as SP6700 from the Schnectady company.

Phenolic resins are conventionally produced by an acid condensation of phenol, or a mixture of phenols, with an aldehyde, usually formaldehyde. Such phenolic resins might be referred to as two-stage resins and are conventionally known as novolacs. This technology is understood to be well known to those having skill in such art. The Schenectady resin SP6700 is a two-stage phenolic resin from a condensation of a phenol and aldehyde, (a novolac), in which the phenolic component is a mixture of phenol and liquid cashew nut oil which might sometimes be referred to as "CSL". The CSL might be described as a mixture of primarily monophenols substituted in the meta position with C15 hydrocarbon chains.

A significant feature of this invention is that it has been observed that hexamethylene tetramine, a well known methylene donor, did not work satisfactorily for use in this invention where the starch-based materials are utilized either by itself or in combination with the preferred methylene acceptors, namely, phenolic cashew nut oil resins. This result was unexpected and illustrated that not all methylene donor compounds, as a chemical class of materials, work satisfactorily for the purposes of this invention.

A significant aspect of use of a methylene donor, exclusive of hexamethylene tetramine, in combination with starch, modified starch or starch/plasticizer composite is an observed improvement in tear resistance of a rubber composition which is an important physical property of rubber compositions to be used for various components of a tire.

In practice, it has been observed herein that the hexamethylene tetramine, which is often though of as being a methylene donor (see U.S. Pat. No. 5,886,074) was not observed herein to behave in a manner similar to other common methylene donors such as for example hexamethoxymethylmelamine.

A significant aspect is that it has been observed herein that the use of a methylene donor or a methylene acceptor, or a combination of both, resulted in an improved tear resistance property for a vulcanized rubber composition.

In particular, is has been observed herein that a significant aspect of use of a combination of methylene acceptor, particularly a phenolic cashew nut oil resin, and methylene donor, exclusive of hexamethylene tetramine, in combination with starch, modified starch or starch/plasticizer composite provided an improved tear resistance property for a vulcanized rubber composition better than use of a silane coupling agent alone for tear resistance improvement.

In practice, the moiety of the coupling agent which is reactive with the starch, modified starch and starch/plasticizer composite as well as silica surfaces is generally considered herein as being capable of reacting with at least one or more hydroxyl groups on their surfaces and possibly with other reactive groups thereon.

In the practice of this invention, the starch, modified starch and starch/plasticizer composite may be desired to be used, for example, as a free flowing, dry powder or in a free flowing, dry pelletized form.

With regard to the modified starch, various modified starches may be utilized. Representative of commercially available modified starches are, for example hydroxyethylated starch as ETHYLEX 2095, oxidized starch as STA-COTE H44 and acid modified starch as ECLIPSE G, all from the A. E. Staley Manufacturing Company.

Where the modified starch is a hydroxyethylated starch, it might be described, for example, as a starch which has been subjected to a treatment in which hydroxyethyl groups have been substituted for a very small number of hydroxyl groups of the starch.

With regard to the starch/plasticizer composite, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolyzed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, for the starch/plasticizer composite, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

While, for the starch/plasticizer composite, the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

For the starch/plasticizer composite, representative examples of synthetic plasticizers are, for example, poly (ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, for the starch/plasticizer composite, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

For the starch/plasticizer composite, various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

In the practice of this invention, the aforesaid additional inorganic fillers may be, for example, selected from one or more of kaolin clay, talc, short discrete fibers, thermoplastic powders such as polyethylene and polypropylene particles, or other reinforcing or non-reinforcing inorganic fillers.

In the description of this invention, such additional inorganic fillers are intended to be exclusive of, or to not include, pigments conventionally used in the compounding, or preparation of, rubber compositions such as zinc oxide, titanium oxide and the like, although, of course zinc oxide is conventionally used in the rubber compositions of this invention.

The additional short fibers for use in the rubber composition of this invention may be, for example, of organic polymeric materials such as cellulose, aramid, nylon and polyester.

In practice, the said starch/synthetic plasticizer composite has a moisture content in a range of about zero to about 30, alternatively about one to about six, weight percent.

In practice, as hereinbefore pointed out, the elastomer reinforcement may be (i) the starch/plasticizer composite or (ii) a combination of the starch/plasticizer composite and at least one of carbon black and amorphous silica, particularly precipitated silica or (iii) optionally a combination of the starch/plasticizer, carbon black and/or precipitated silica and at least one other inorganic filler, wherein a coupler is optionally used to couple the starch composite and the silica, if silica is used, to the diene based elastomer(s).

It is considered herein that, where desired, the said starch-based material can be used as (i) a partial or (ii) complete replacement for carbon black and/or silica reinforcement for sulfur vulcanizable elastomers, depending somewhat upon the properties desired for the cured, or vulcanized, rubber composition.

In practice, it is generally preferred that the rubber reinforcing carbon black is used in conjunction with the said starch-based material in an amount of at least 5 and preferably at least 35 phr of carbon black, depending somewhat upon the structure of the carbon black. Carbon black structure is often represented by its DBP (dibutylphthalate) value. Reinforcing carbon blacks typically have a DBP number in a range of about 40 to about 400 cc/100 gm, and more usually in a range of about 80 to about 300 (ASTM D 1265). If the carbon black content is used with a view to providing an elastomer composition with a suitable electrical conductivity to retard or prevent appreciable static electricity build up, a minimum amount of carbon black in the elastomer composition might be, for example, about 10 phr of a highly electrically conductive carbon black is used, otherwise usually at least about 25 and often at least about 35 phr of carbon black is used.

If desired, and on a practical basis, it is usually preferred that the coupling agent for the said starch-based material can be the same coupler as could be used for the silica, if silica is used. Thus, it is considered herein that the moiety of the coupling agent reactive with the surface of the starch-based material is also reactive with the hydroxyl (e.g. SIOH) groups, and/other reactive groups, typically on the surface of the silica.

It is important to appreciate that, preferably, the said search-based material is not used as a total replacement for carbon black and/or silica in an elastomer composition. Thus, in one aspect, it is considered that the starch-based material is to be typically used as a partial replacement for carbon black and/or silica reinforcement for sulfur vulcanizable elastomers.

It is important to appreciate that, while starch itself might be used in combination with the starch/plasticizer composite, they are not considered herein as equal alternatives. Thus, while starch might sometimes be considered suitable as a reinforcement for the elastomer composition together with the coupling agent, the starch/plasticizer composite may be considered more desirable for some applications, even when used without a coupling agent.

If silica is used as a reinforcement together with carbon black, the weight ratio of silica to carbon black is desirably in a weight ratio in a range of about 0.1/1 to about 10/1, thus at least 0.1/1, alternatively at least about 0.9/1, optionally at least 3/1 and sometimes at least 10/1.

The weight ratio of said silica coupler to the starch composite and silica, if silica is used, may, for example, be in a range of about 0.01/1 to about 0.2/1 or even up to about 0.4/1.

The starch is recited as being composed of amylose units and/or amylopectin units. These are well known components of starch. Typically, the starch is composed of a combination of the amylose and amylopectin units in a ratio of about 25/75. A somewhat broader range of ratios of amylose to amylopectin units is recited herein in order to provide a starch for the starch composite which interact with the plasticizer somewhat differently. For example, it is considered herein that suitable ratios may be from about 20/80 up to 100/0, although a more suitable range is considered to be about 15/85 to about 35/63. Thus, the starch may be composed primarily or even entirely of amylose units.

The starch can typically be obtained from naturally occurring plants, as hereinbefore referenced. Corn starch is believes to be a rather common natural starch. The starch/plasticizer composite can be present in various particulate forms such as, for example, fibrils, spheres or macromolecules, which may, in one aspect, depend somewhat upon the ratio of amylose to amylopectin in the starch as well as the plasticizer content in the composite.

The relative importance, if any, of such forms of the starch is the difference in their reinforcing associated with the filler morphology. The morphology of the filler primarily determines the final shape of the starch composite within the elastomer composition, in addition, the severity of the mixing conditions such as high shear and elevated temperature can allow to optimize the final filler morphology. Thus, the starch composite, after mixing, may be in a shape of one or more of hereinbefore described forms.

It is important to appreciate that the starch, by itself, is hydrophilic in nature, meaning that it has a strong tendency to bind or absorb water. Thus, the moisture content for the starch and/or starch composite has been previously discussed herein. This is considered to be an important, or desirable, feature in the practice of this invention because water can also act somewhat as a plasticizer with the starch and which can sometimes associate with the plasticizer itself for the starch composite such as polyvinyl alcohol and cellulose acetate, or other plasticizer which contain similar functionalities such as esters of polyvinyl alcohol and/or cellulose acetate or any plasticizer which can depress the melting point of the starch.

Various grades of the starch/plasticizer composition can be developed to be used with various elastomer compositions and processing conditions.

As hereinbefore pointed out, the starch typically has a softening point in a range of about 180° C. to about 220° C., depending somewhat upon its ratio of amylose to amylopectin units, as well as other factors and, thus, does not readily soften when the rubber is conventionally mixed, for example, at a temperature in a range of about 140° C. to about 165° C. Accordingly, after the rubber is mixed, the starch remains in a solid particulate form, although it may become somewhat elongated under the higher shear forces generated while the rubber is being mixed with its compounding ingredients. Thus, the starch remains largely incompatible with the rubber and is typically present in the rubber composition in individual domains.

However, it is now considered herein that providing starch in a form of a starch composite of starch and a plasticizer is particularly beneficial in providing such a composite with a softening point in a range of about 110° C. to about 160° C.

The plasticizers can typically be combined with the starch such as, for example, by appropriate physical mixing processes, particularly mixing processes that provide adequate shear force.

The combination of starch and, for example, polyvinyl alcohol or cellulose acetate, is referred to herein as a "composite". Although the exact mechanism may not be completely understood, it is believed that the combination is not a simple mixture but is a result of chemical and/or physical interactions. It is believed that the interactions lead to a configuration where the starch molecules interact via the amylose with the vinyl alcohol, for example, of the plasticizer molecule to form complexes, involving perhaps chain entanglements. The large individual amylose molecules are believed to be interconnected at several points per molecule with the individual amylopectin molecules as a result of hydrogen bonding (which might otherwise also be in the nature of hydrophilic interactions).

This is considered herein to be beneficial because by varying the content and/or ratios of natural and synthetic components of the starch/plasticizer composite it is believed to be possible to alter the balance between hydrophobic and hydrophilic interactions between the starch components and the plasticizer to allow, for example, the starch composite filler to vary in form from spherical particles to fibrils.

In particular, it is considered herein that adding a polyvinyl alcohol to the starch to form a composite thereof, particularly when the polyvinyl alcohol has a softening point in a range of about 90° C. to about 130° C., can be beneficial to provide resulting starch/plasticizer composite having a softening point in a range of about 110° C. to about 160° C., and thereby provide a starch composite for blending well with a rubber composition during its mixing stage at a temperature, for example, in a range of about 110° C. to about 165° C. or 170° C.

In a further aspect of the invention, a tire is provided having at least one component comprised of the said starch-based material containing rubber composition of this invention. Although not limited thereto, such tire components can be at least one of tread, tread base or tread undertread, tire innerliner, sidewall apexes, wedges for the tire shoulder, sidewall, carcass ply and breaker wire coating rubber compositions, bead insulation rubber composition and cushion or gumstrips for addition to various parts of the tire construction. As used herein, the tread and tread base may be collectively referred to herein as the "tread", or "circumferential tread". Such tire components are well known those skilled in such art.

As an aspect feature of this invention, a tire is provided having a circumferential tread component comprised of the said rubber composition of this invention with the aforesaid tire component, thus, being its tread. As is well known to those skilled in such art, such tire tread is typically designed to be ground-contacting.

As a further aspect of this invention, a tire is provided with sidewall apex components comprised of the said rubber composition of this invention.

As an additional aspect of the invention, a tire is provided with a sidewall insert component positioned in the tire sidewall and apart from its bead portion comprised of the rubber composition of this invention where it might be desired to modify the physical properties of the tire sidewall.

Historically, the more homogeneous the dispersion of rubber compound components into the rubber, the better the resultant cured properties of that rubber. It is considered herein that it is a particular feature of this invention that the starch composite mixes with the rubber composition during the rubber mixing under high shear conditions and at a temperature in a range of about 140° C. to about 165° C., in a manner that very good dispersion in the rubber mixture is obtained. This is considered herein to be important because upon mixing the elastomer composition containing the starch/plasticizer composite to a temperature to reach the melting point temperature of the composite, the starch composite will contribute to the development of high shearing forces which is considered to be beneficial to ingredient dispersion within the rubber composition. Above the melting point of the starch composite, for example, around 150° C., it will melt and maximize its reaction with the coupling agent.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it is considered that the elastomer is a sulfur curable elastomer. The diene-based elastomer may be selected from at least one of homopolymers of isoprene and 1,3-butadiene and copolymers of isoprene and/or 1,3-butadiene with a aromatic vinyl compound selected from at least one of styrene and alpha-methylstyrene. Accordingly such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber and medium to high vinyl polybutadiene rubber having a vinyl 1,2-content in a range of about 15 to about 85 percent and emulsion polymerization prepared butadiene/acrylonitrile copolymers. Such medium to high vinyl polybutadiene rubber may be more simply referred to herein as a high vinyl polybutadiene.

The rubber composition is preferably of at least two diene-based rubbers.

In one aspect, an emulsion polymerization derived styrene/butadiene (E-SBR) might be used having a relatively conventional styrene content of about 20 to about 30 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%.

Emulsion polymerization prepared styrene/butadiene/acrylonitrile copolymer rubbers (E-SBAR) containing about 2 to about 50 weight percent bound acrylonitrile in the terpolymer are also contemplated as diene-based rubbers for use in this invention.

The solution polymerization prepared SBR (S-SBR) typically has a bound styrene content in a range of about 5 to about 50, preferably about 9 to about 36, percent. Its' butadiene portion may have a vinyl content in a range of about 10 to about 50 percent. The S-SBR can be conveniently prepared, for example, by organo lithium catalyzation in the presence of an organic hydrocarbon solvent.

A purpose of using S-SBR is to enhance tire rolling resistance since it should tend to promote lower hysteresis for tire tread compositions.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The commonly-employed siliceous pigments used in rubber compounding applications can be used as the silica in this invention, including pyrogenic and precipitated siliceous pigments (silica), although precipitate silicas are preferred.

Amorphous silicas preferably employed in this invention are precipitated silicas such as, for example, those obtained by the acidification of a soluble silicate, e.g., sodium silicate. Such precipitated silicas are intended to include alumino-silicates.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, Zeosil 1165MP and silicas available from Degussa AG with, for example, designations VN2 and VN3, as well as other grades of silica, particularly precipitated silicas, which can be used for elastomer reinforcement.

The amorphous silicas are conventionally used in conjunction with a coupling agent and it is intended herein that the coupling agent may be also be reactive with starch-based materials used for this invention, particularly with hydroxyl groups of the starch based materials.

While various coupling agents may be used, a variety of coupling agents is a coupling agent is comprised of a bis (3-trialkoxysilylalkyl) polysulfide wherein said alkyl groups for the trialkoxy component are selected from methyl and ethyl radicals, wherein said alkyl group for said silylalkyl component is selected from ethyl, propyl and butyl radicals and wherein the polysulfide bridge contains an average of about 2.2 to about 4 connecting sulfur atoms.

Exemplary of such coupling agent is a bis-(3-triethoxysilylpropyl) polysulfide where the polysulfide bridge contains an average of from about 2.2 to about 4 and particularly an average of from about 2.2 to about 2.6, (a disulfide material), or an average of from about 3.4 to about 4, (a tetrasulfide material),4 sulfur atoms in its polysulfide bridge.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the utilization of specified blends of rubbers in rubber compositions, in combination with various starch, modified starch and starch/plasticizer composite and methylene donor and/or methylene acceptor compounds in various rubber compositions.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, starch-based material, and fillers such as carbon black and optional silica and coupler, and/or non-carbon black and non-silica fillers, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, three fillers are utilized in a natural rubber composition.

The three fillers are carbon black, silica and starch-based material wherein the starch-based material is utilized as corn starch or as a starch/plasticizer composite.

The basic formulation in shown in Table 1 in which the silica, starch or starch/plasticizer composite, as well as the coupling agent are shown as being used in variable amounts.

In Table 2 the variable amounts of the silica, starch or starch/plasticizer composite and coupling agent are shown as well as various physical properties of the resulting rubber composition.

The individual rubber samples are shown in Tables 2 and 2A as Samples A–F, wherein all of the Samples contained silica and a coupling agent, Samples C and D also contained starch and Samples E and F also contained a starch/plasticizer composite.

The rubber compositions containing the materials illustrated in Table 1 were prepared in a Kobe Banbury rubber mixer using three separate, sequential stages of addition (mixing), namely, two non-productive mix stages, in which ingredients are added during both non-productive mixing stages and one final productive mix to temperatures of about 160° C., 150° C., and 108° C., respectively, and times of about 4 minutes, 4 minutes and 2 minutes, respectively. However, the silica and coupler are added in the second non-productive mix stage with the starch compound.

TABLE 1

| Material | Parts |
|---|---|
| 1$^{st}$ Non-Productive | |
| Cis 1,4-polyisoprene rubber[1] | 100 |
| Carbon black[2] | 15 |
| Silica[3] | Variable (0 or 20) |
| Starch[4] | Variable (0 or 20) |
| Starch composite[5] | Variable (0 or 20) |
| Coupling agent[6] | Variable (0 or 3) |
| Processing oil[7] | 5 |
| Zinc oxide | 5 |
| Antioxidant[8] | 2 |
| Fatty acid[9] | 2 |

TABLE 1-continued

| Material | Parts |
|---|---|
| 2nd Non-Productive | |
| Silica[3] | 15 |
| Coupling agent[6] | 2 |
| Productive | |
| Sulfur | 1.5 |
| Accelerators[9] | 2.5 |

[1]Synthetic cis 1,4-polyisoprene rubber as NAT2200 from The Goodyear Tire & Rubber Company.
[2]N299, a carbon black ASTM designation.
[3]HiSil 210 from PPG Industries, Inc.
[4]Mater Bi 1128RR-H from the Novamont company as a composite of starch and ethylene vinyl copolymer (40.50 weight ratio) with natural plasticizers, having a softening point of about 147° C.
[5]Unmodified corn starch as Staley Pearl Starch, a trademark of the A. E. Staley Manufacturing Company.
[6]A coupler as a 50% active composite composed of an organosilane tetrasulfide on or with carbon black in a 50/50 weight ratio available as material X50S from Degussa GmbH. Technically the organosilane polysulfide is understood to be a composite, or mixture, in which the average polysulfide bridge contains about 3.5 to 4 connecting sulfur atoms, although the mixture may contain such polysulfides with about 2 to 8 connecting sulfur atoms.
[7]Flexon 641 from Exxon.
[8]Of the quinoline type.
[9]A combination of sulfenamide with a minor amount of diphenylguanidine.

The resulting Samples are vulcanized for about 36 minutes at a temperature of about 150° C. and various of their physical properties are shown in the following Tables 2 and 2A.

TABLE 2

| Ingredients | Sample A | Sample B | Sample C |
|---|---|---|---|
| Carbon black | 15 | 15 | 15 |
| Silica | 35 | 35 | 15 |
| Starch | 0 | 0 | 20 |
| Starch composite | 0 | 0 | 0 |
| Coupling agent | 2 | 5 | 2 |
| Properties | | | |
| A. Rheometer (150° C.) | | | |
| Max. Torque, dNm | 41.5 | 44.6 | 41.3 |
| Min. Torque, dNm | 6.8 | 6.2 | 6.1 |
| Delta torque, dNm | 34.7 | 38.4 | 34.8 |
| $T_{90}$, minutes | 17.4 | 15.7 | 12.7 |
| B. Stress-Strain | | | |
| Tensile strength, MPa | 24.4 | 25.9 | 18.9 |
| Elongation @ break, % | 561 | 527 | 490 |
| Modulus, 300%, MPa | 9.1 | 11.8 | 7.6 |
| C. Rebound, 100° C., % | 66 | 68 | 80 |
| D. Hardness, Shore A, 23° C. | 62 | 65 | 58 |
| E. Tear strength, N, 95° C. | 142 | 73 | 18 |
| F. DIN abrasion | 145 | 133 | 208 |

TABLE 2A (a Continuation of Table 2)

| Ingredients | Sample D | Sample E | Sample F |
|---|---|---|---|
| Carbon black | 15 | 15 | 15 |
| Silica | 15 | 15 | 15 |
| Starch | 20 | 0 | 0 |
| Starch composite | 0 | 20 | 20 |
| Coupling agent | 5 | 2 | 5 |
| Properties | | | |
| A. Rheometer (150° C.) | | | |
| Max Torque, dNm | 46 | 38.9 | 40.1 |
| Min Torque, dNm | 5.8 | 5.9 | 5.5 |
| Delta torque, dNm | 40.2 | 33 | 34.6 |
| $T_{90}$, minutes | 15.8 | 12.7 | 13.2 |
| B. Stress-Strain | | | |
| Tensile strength, MPa | 19.2 | 20 | 20.1 |
| Elongation at break, % | 448 | 485 | 438 |
| Modulus, 300%, MPa | 9.7 | 10.0 | 12.6 |
| C. Rebound, 100° C., % | 78 | 76 | 76 |
| D. Hardness, Shore A, 23° C. | 63 | 63 | 65 |
| E. Tear strength, N, 95° C. | 14 | 15 | 14 |
| F. DIN abrasion | 204 | 196 | 186 |

The tensile strength values are measures of maximum stress when the sample specimen reaches its maximum elongation. Such physical property is well known to those having skill in such art.

The elongation values are measures of maximum elongation of the sample specimen before failure. Such physical property is well known those having skill in such art.

The Shore A hardness values are measures of a sample's resistance to localized plastic deformation.

The Rebound values are measures of a sample's capacity to adsorb energy when it is deformed under load and recovers upon removing the applied load.

The DIN abrasion values are measures of relative volume loss of a sample upon exposure to an applied abrasive wheel under specified load as compared to a comparative control rubber composition. Lower values are indicative of greater resistance to abrasion. The DIN test is conducted at a load of 2 Kg.

It is readily seen from Tables 2 and 2A that use of a reduced amount of silica in combination with corn starch (Samples C and D) or with a starch/plasticizer composite (Samples E and F) resulted in improved Rebound, with a significant loss of tear strength and abrasion resistance when compared to Samples A and B.

It is also readily seen that the DIN abrasion resistance of the rubber compositions which used the starch/plasticizer composite (Samples E and F) were better than the corn starch-containing rubber composition of Samples C and D.

Therefore, it is concluded herein, as observed, that the replacement of silica with corn starch in a carbon black/silica reinforced rubber composition provides higher rebound, but a sharp loss of abrasion resistance and tear resistance. The starch/plasticizer composite is observed to be better for abrasion resistance than the unmodified corn starch.

EXAMPLE II

Additional rubber samples are prepared using the rubber composition shown in the following Table 3 using a procedure described in Example I except that two fillers are used, namely carbon black and either silica, corn starch or starch/plasticizer composite, instead of three fillers.

The basic formulation is shown in Table 3 where the silica, corn starch, starch/plasticizer composite and coupling agent are recited as being variable.

In Table 4 the variable amounts of the silica, starch, starch composite and coupling agent are shown as well as various physical properties of the resulting rubber composition.

The individual rubber samples are shown in Table 4 as Samples G–L, wherein Samples G and H contained silica, Samples I and J contained corn starch and Samples K and L contained a starch/plasticizer composite.

TABLE 3

| Material | Parts |
| --- | --- |
| 1st Non-Productive | |
| Cis 1,4-polyisoprene rubber | 100 |
| Carbon black | 35 |
| Processing oil | 5 |
| Antioxidant | 2 |
| Fatty acid | 2 |
| Zinc oxide | 5 |
| 2nd Non-Productive | |
| Silica | Variable (0 or 15) |
| Starch | Variable (0 or 15) |
| Starch composite | Variable (0 or 15) |
| Coupling agent | Variable (0 or 2) |
| Productive | |
| Sulfur | 1.5 |
| Sulfenamide accelerator | 1 |

The Samples were vulcanized for about 36 minutes at about 150° C. and various physical properties are shown in Tables 4 and 4A.

TABLE 4

| Ingredients | Sample G | Sample H | Sample I |
| --- | --- | --- | --- |
| Carbon black | 35 | 35 | 35 |
| Silica | 15 | 15 | 0 |
| Starch | 0 | 0 | 15 |
| Starch composite | 0 | 0 | 0 |
| Coupling agent | 0 | 2 | 0 |
| Properties | | | |
| A. Rheometer (150° C.) | | | |
| Max. Torque, dNm | 27.6 | 31.5 | 34.9 |
| Min. Torque, dNm | 6.7 | 6.2 | 6 |
| Delta torque, dNm | 20.9 | 25.3 | 28.9 |
| $T_{90}$, minutes | 22.1 | 19.1 | 14.7 |
| B. Stress-Strain | | | |
| Tensile strength, MPa | 21.7 | 24.2 | 21.2 |
| Elongation @ break, % | 629 | 593 | 549 |
| Modulus, 300%, MPa | 5.5 | 8.1 | 7 |
| C. Rebound, 100° C., % | 59 | 63 | 72 |
| D. Hardness, Shore A, 23° C. | 53 | 56 | 57 |
| E. Tear strength, N, 95° C. | 236 | 240 | 84 |
| F. DIN abrasion | 256 | 152 | 208 |

TABLE 4A (a Continuation of Table 4)

| Ingredients | Sample J | Sample K | Sample L |
| --- | --- | --- | --- |
| Carbon black | 35 | 35 | 35 |
| Silica | 0 | 0 | 0 |
| Starch | 15 | 0 | 0 |
| Starch composite | 0 | 15 | 15 |
| Coupling agent | 2 | 0 | 2 |
| Properties | | | |
| A. Rheometer (150° C.) | | | |
| Max. Torque, dNm | 35.2 | 32.1 | 34.2 |
| Min. Torque, dNm | 5.7 | 6.7 | 6.4 |
| Delta torque, dNm | 29.5 | 25.4 | 27.8 |
| $T_{90}$, minutes | 14.6 | 15.1 | 14.2 |
| B. Stress-Strain | | | |
| Tensile strength, MPa | 22.1 | 22.3 | 23.9 |
| Elongation @ break, % | 555 | 571 | 554 |
| Modulus, 300%, MPa | 7.5 | 7.9 | 9.7 |
| C. Rebound, 100° C., % | 70 | 66 | 65 |
| D. Hardness, Shore A, 23° C. | 57 | 60 | 62 |
| E. Tear strength, N, 95° C. | 83 | 104 | 138 |
| F. DIN abrasion | 198 | 178 | 161 |

It can readily be seen from Tables 4 and 4A that improved Rebound can be seen in Samples I, J, K and L, where a reduced amount of silica is used and either corn starch has been added (Samples C and D) or starch/plasticizer composite has been added (Samples E and F) as compared to Samples A and B.

However, the addition of the corn starch or the starch/plasticizer composite as replacements for silica in a carbon black reinforced rubber composition is observed to generate lower tear resistance and worse abrasion resistance for the respective rubber compositions.

The starch/plasticizer composite containing Samples K and L were observed to yield better tear resistance and abrasion resistance than the unmodified corn starch Samples I and J.

The silica, corn starch and starch/plasticizer composite containing Samples H, J and L, which also utilized a coupling agent, were all observed to show improved tear resistance and abrasion resistance.

EXAMPLE III

Additional rubber samples are prepared using the rubber composition shown in the following Table 5 using a procedure described in Example I except that two fillers are used in the absence of silica and coupling agent, namely carbon black and corn starch or starch/plasticizer composite.

Also, for this Example, methylene donors were added in a form of either hexamethoxymethylmelanime or hexamethylene tetramine. Both are well known methylene donors used in various rubber compositions. for example, see U.S. Pat. No. 5,886,074.

The basic formulation is shown in Table 5 where the starch, starch/plasticizer composite, hexamethoxymethylmelamine, and hexamethylene tetramine are recited as being variable.

In Table 6 the variable amounts of the starch, starch/plasticizer composite, hexamethoxymethylmelamine, and hexamethylene tetramine are shown as well as various physical properties of the resulting rubber composition.

The individual rubber samples are shown in Table 6 as Samples M–R, wherein Samples M–Q contained the corn starch and Samples P–R contained the starch/plasticizer composite.

Samples O and R also contained the hexamethoxymethylmelamine which is typically a methylene donor and Samples N and Q contained the hexamethylene tetramine which is also typically a methylene donor.

TABLE 5

| Material | Parts |
|---|---|
| 1st Non-Productive | |
| Cis 1,4-polyisoprene rubber | 100 |
| Carbon black | 35 |
| Processing oil | 5 |
| Zinc oxide | 5 |
| Antioxidant | 2 |
| Fatty acid | 2 |
| 2nd Non-Productive | |
| Starch | Variable (0 or 15) |
| Starch composite | Variable (0 or 15) |
| Hexamethoxymethylmelamine | Variable (0 or 2) |
| Hexamethylene tetramine | Variable (0 or 2) |
| Productive | |
| Sulfur | 1.5 |
| Sulfenamide accelerator | 1 |

The Samples were vulcanized for about 36 minutes at about 150° C. and various physical properties are shown in the following Tables 6 and 6A.

TABLE 6

| Ingredients | Sample M | Sample N | Sample O |
|---|---|---|---|
| Starch | 15 | 15 | 15 |
| Starch composite | 0 | 0 | 0 |
| Hexamethoxymethylmelamine | 0 | 0 | 2 |
| Hexamethylene tetramine | 0 | 2 | 0 |
| Properties | | | |
| A. Rheometer (150° C.) | | | |
| Max. Torque, dNm | 34.9 | 37.1 | 33 |
| Min. Torque, dNm | 6 | 6.3 | 6.3 |
| Delta torque, dNm | 28.9 | 30.8 | 26.7 |
| $T_{90}$, minutes | 14.7 | 10.4 | 13.4 |
| B. Stress-Strain | | | |
| Tensile strength, MPa | 21.2 | 18.6 | 17.7 |
| Elongation @ break, % | 549 | 508 | 568 |
| Modulus, 300%, MPa | 7 | 7.8 | 6 |
| C. Rebound, 100° C., % | 72 | 73 | 67 |
| D. Hardness, Shore A, 23° C. | 57 | 56 | 53 |
| E. Tear strength, N, 95° C. | 84 | 39 | 112 |
| F. DIN abrasion | 208 | 209 | 217 |

TABLE 6A (a Continuation of Table 6)

| Ingredients | Sample P | Sample Q | Sample R |
|---|---|---|---|
| Starch | 0 | 0 | 0 |
| Starch composite | 15 | 15 | 15 |
| Hexamethoxymethylmelamine | 0 | 0 | 2 |
| Hexamethylene tetramine | 0 | 2 | 0 |
| Properties | | | |
| A. Rheometer (150° C.) | | | |
| Max. Torque, dNm | 32.1 | 35 | 32 |
| Min. Torque, dNm | 6.7 | 7 | 7 |
| Delta torque, dNm | 25.4 | 28 | 25 |
| $T_{90}$, minutes | 15.1 | 8.9 | 14 |
| B. Stress-Strain | | | |
| Tensile strength, MPa | 22.3 | 19.4 | 20 |
| Elongation @ break, % | 571 | 523 | 560 |
| Modulus, 300%, MPa | 7.9 | 8.7 | 8.5 |
| C. Rebound, 100° C., % | 66 | 67 | 65 |
| D. Hardness, Shore A, 23° C. | 60 | 58 | 53 |
| E. Tear strength, N, 95° C. | 104 | 42 | 124 |
| F. DIN abrasion | 178 | 186 | 174 |

It can readily be seen from Tables 6 and 6A that the rubber samples containing the hexamethylene tetramine resulted in a significant reduction in tear resistance with the corn starch (Sample N) or starch/plasticizer composite (Sample Q) reinforced Samples.

Whereas, the hexamethoxymethyl melamine addition resulted in a significant improvement in tear resistance for the corn starch containing rubber sample (Sample O) or rubber sample which contained the starch composite (Sample R) reinforced rubber composition.

These results illustrate that the choice of methylene donor type of material is critical for the observed tear resistance improvement for the rubber composition containing a starch-based material.

EXAMPLE IV

Additional rubber samples are prepared using the rubber composition shown in the following Table 7 which is similar to Example III except that a phenolic cashew nut oil resin is also selectively added which is a recognized methylene acceptor.

The basic formulation is shown in Table 7 where the starch, starch/plasticizer composite, hexamethoxymethylmelamine, hexamethylene tetramine and phenolic cashew nut oil resin are recited as being variable.

In Tables 8 and 8A the variable amounts of the starch, starch/plasticizer composite, hexamethoxymethylmelamine, hexamethylene tetramine and phenolic cashew nut oil resin are shown as well as various physical properties of the resulting rubber composition.

The individual rubber samples are shown in Tables 8 and 8A as Samples S–X, wherein Samples S–U contained the corn starch and Samples V–X contained the starch/plasticizer composite.

Samples U and X also contained the hexamethoxymethylmelamine and Samples T and W contained the hexamethylene tetramine.

Samples T, U, W and X contained the phenolic cashew nut oil resin.

TABLE 7

| Material | Parts |
|---|---|
| 1st Non-Productive | |
| Cis 1,4-polyisoprene rubber | 100 |
| Carbon black | 35 |
| Processing oil | 5 |
| Zinc oxide | 5 |
| Antioxidant | 2 |
| Fatty acid | 2 |
| 2nd Non-Productive | |
| Starch | Variable (0 or 15) |
| Starch composite | Variable (0 or 15) |
| Hexamethoxymethylmelamine | Variable (0 or 2) |
| Hexamethylene tetramine | Variable (0 or 2) |
| Phenolic cashew nut oil resin[1] | Variable (0 or 2) |
| Productive | |
| Sulfur | 1.5 |
| Sulfenamide accelerator | 1 |

[1] Resin as SP6700 from the Schenectady Chemical Company.

The Samples were vulcanized at a temperature of about 150° C. for about 36 minutes and various physical properties are shown in Tables 8 and 8A.

TABLE 8

| Ingredients | Sample S | Sample T | Sample U |
|---|---|---|---|
| Carbon black | 35 | 35 | 35 |
| Starch | 15 | 15 | 15 |
| Starch composite | 0 | 0 | 0 |
| Hexamethoxymethylmelamine | 0 | 0 | 2 |
| Hexamethylene tetramine | 0 | 2 | 0 |
| Phenolic cashew nut oil resin | 0 | 2 | 2 |
| Properties | | | |
| A. Stress-Strain | | | |
| Tensile strength, MPa | 21.2 | 18.3 | 18.3 |
| Elongation @ break, % | 549 | 511 | 567 |
| Modulus, 300%, MPa | 7 | 7.8 | 6.7 |
| B. Rebound, 100° C., % | 72 | 69 | 64 |
| C. Hardness, Shore A, 23° C. | 57 | 60 | 56 |
| D. Tear strength, N, 95° C. | 84 | 58 | 123 |
| E. DIN abrasion | 208 | 206 | 213 |

TABLE 8A (a Continuation of Table 8)

| Ingredients | Sample V | Sample W | Sample X |
|---|---|---|---|
| Carbon black | 35 | 35 | 35 |
| Starch | 0 | 0 | 0 |
| Starch composite | 15 | 15 | 15 |
| Hexamethoxymethylmelamine | 0 | 0 | 2 |
| Hexamethylene tetramine | 0 | 2 | 0 |
| Phenolic cashew nut oil resin | 0 | 2 | 2 |
| Properties | | | |
| A. Stress-Strain | | | |
| Tensile strength, MPa | 22.3 | 19.9 | 20.8 |
| Elongation @ break, % | 571 | 523 | 545 |
| Modulus, 300%, MPa | 7.9 | 9.5 | 9.5 |
| B. Rebound, 100° C., % | 66 | 64 | 61 |
| C. Hardness, Shore A, 23° C. | 60 | 62 | 60 |
| D. Tear strength, N, 95° C. | 104 | 57 | 175 |
| E. DIN abrasion | 178 | 188 | 164 |

It can readily be seen from Tables 8 and 8A that rubber compositions containing the combination of hexamoxymethylamine with the phenolic cashew nut oil resin gave improved tear resistance with the corn starch (Sample U) or starch/plasticizer composite (Sample X) and improved abrasion resistance with the starch composite.

In contrast, rubber compositions containing the combination of hexamethylene tetramine with the phenolic cashew nut oil resin resulted in worse tear resistance with the corn starch or the starch/plasticizer composite (Samples T and W) and no improvement in abrasion resistance with the starch or starch/plasticizer composite (Samples T and W).

Therefore, it is concluded herein that the hexamethylene tetramine, a typical methylene donor, does not act to provide improved abrasion resistance and tear resistance properties for the rubber composition when used in combination with the phenolic cashew nut oil resin methylene acceptor compound.

EXAMPLE IV

In this Example, various commercially available modified starches are evaluated as fillers in combination with carbon black and compared to unmodified corn starch.

In particular, an hydroxyethylated starch, an oxidized starch and an acid modified starch are evaluated.

For some of the rubber compositions, hexamethoxymethylmelamine is also added.

The preparation procedure of Example I is utilized.

The rubber samples were prepared using the rubber composition shown in the following Table 9 in which the starch, modified starch(es) and hexamethoxymethylmelamine are shown as being variable.

In Tables 10 and 10A the variable amounts of the starch, modified starch(es) and hexamethoxymethylmelamine are shown as well as various physical properties of the resulting rubber compositions.

The individual rubber samples are shown in Tables 10 and 10A as Samples AA–HH, wherein Samples AA and BB contained the corn starch, Samples CC and DD contained the hydroxyethylated starch, Samples EE and FF contained the oxidized starch and Samples GG and HH contained the acid modified starch.

Samples BB, DD, FF and HH also contained the hexamethoxymethylmelamine.

TABLE 9

| Material | Parts |
|---|---|
| 1st Non-Productive | |
| Cis 1,4-polyisoprene rubber | 100 |
| Carbon black | 35 |
| Processing oil | 5 |

TABLE 9-continued

| Material | Parts |
|---|---|
| Zinc oxide | 5 |
| Antioxidant | 2 |
| Fatty acid | 2 |
| 2nd Non-Productive | |
| Starch | Variable (0 or 15) |
| Starch, modified | Variable (0 or 15) |
| Hexamethoxymethylmelamine | Variable (0 or 2) |
| Productive | |
| Sulfur | 1.5 |
| Sulfenamide accelerator | 1 |

[1] An hydroxyethylated starch obtained as ETHYLEX 2095 from the A. E. Staley Manufacturing Company.
[2] An oxidized starch obtained as STA-COTE H44 from the A. E. Staley Manufacturing Company.
[3] An acid modified starch obtained as ECLIPSE G from the A. E. Staley Manufacturing Company.

The Samples were vulcanized at about 150° C. for about 36 minutes and various physical properties are shown in the following Tables 10 and 10A.

TABLE 10

| Ingredients | AA | BB | CC | DD |
|---|---|---|---|---|
| Starch | 15 | 15 | 0 | 0 |
| Hydroxyethylated starch[1] | 0 | 0 | 15 | 15 |
| Oxidized starch[2] | 0 | 0 | 0 | 0 |
| Acid modified starch[3] | 0 | 0 | 0 | 0 |
| Hexamethoxymethylmelamine | 0 | 2 | 0 | 2 |
| Properties | | | | |
| A. Rheometer (150° C.) | | | | |
| Max. torque, MPa | 14.8 | 15.1 | 15 | 15.1 |
| Min. torque, MPa | 1.4 | 1.7 | 1.6 | 1.7 |
| Delta torque | 12.6 | 13.4 | 13.4 | 13.4 |
| T90, minutes | 15 | 15.9 | 14.8 | 15.6 |
| B. Stress-Strain | | | | |
| Tensile, MPa | 19 | 17.8 | 18.9 | 18.1 |
| Elongation (%) | 569 | 561 | 567 | 572 |
| Modulus (300%), MPa | 6.5 | 6.5 | 6.5 | 6.4 |
| C. Rebound, 100° C., % | 68 | 65 | 67 | 65 |
| D. Hardness, Shore A, 100° C. | 52 | 53 | 52 | 53 |
| E. Tear Strength, N, 95° C. | 74 | 111 | 84 | 126 |
| F. DIN abrasion | 176 | 181 | 176 | 177 |

TABLE 10A (a Continuation of Table 10)

| Ingredients | EE | FF | GG | HH |
|---|---|---|---|---|
| Starch | 0 | 0 | 0 | 0 |
| Hydroxyethylated starch[1] | 0 | 0 | 0 | 0 |
| Oxidized starch[2] | 15 | 15 | 0 | 0 |
| Acid modified starch[3] | 0 | 0 | 15 | 15 |
| Hexamethoxymethylmelamine | 0 | 2 | 0 | 2 |
| Properties | | | | |
| A. Rheometer (150° C.) | | | | |
| Max. torque, MPa | 15.2 | 15.6 | 15.1 | 15.3 |
| Min. torque, MPa | 1.5 | 1.7 | 1.5 | 1.8 |
| Delta torque | 13.7 | 13.9 | 13.6 | 13.5 |
| T90, minutes | 15.1 | 15.6 | 14.8 | 15.8 |
| B. Stress-Strain | | | | |
| Tensile, MPa | 17.4 | 16.7 | 17.2 | 17.6 |
| Elongation (%) | 544 | 550 | 539 | 554 |
| Modulus (300%), MPa | 6.5 | 6.4 | 6.5 | 6.6 |
| C. Rebound, 100° C., % | 68 | 65 | 67 | 66 |
| D. Hardness, Shore A, 100° C. | 53 | 53 | 52 | 53 |
| E. Tear Strength, N, 95° C. | 85 | 118 | 73 | 124 |
| F. DIN abrasion | 179 | 194 | 184 | 189 |

It can readily be seen from Tables 10 and 10A that the rubber compositions containing the hexamethoxymethyl melamine addition (Samples BB, DD, FF and HH) had improved tear resistance as compared to the rubber compositions which contained the unmodified starch (Sample AA) and the modified starch (Samples CC, EE and GG).

EXAMPLE VI

In this Example, various commercially available modified starches are evaluated as fillers in combination with carbon black as well as the corn starch and as well as a phenolic cashew nut oil resin.

In particular, use of hydroxyethylated starch, an oxidized starch and an acid modified starch are evaluated.

For some of the rubber compositions, hexamethoxymethylmelamine and/or phenolic cashew nut oil resin is also added.

The preparation procedure of Example I is utilized.

The rubber samples were prepared using the rubber composition shown in the following Table 11 in which the starch, modified starch(es), hexamethoxymethylmelamine and phenolic cashew nut oil resin are shown as being variable.

In Tables 12 and 12A the variable amounts of the starch, modified starch(es), hexamethoxymethylmelamine and phenolic cashew nut oil resin are shown as well as various physical properties of the resulting rubber compositions.

The individual rubber samples are shown in Tables 12 and 12A as Samples II–PP, wherein Samples II and JJ contained the corn starch, Samples KK and LL contained the hydroxyethylated starch, Samples MM and NN contained the oxidized starch and Samples OO and PP contained the acid modified starch.

Samples JJ, LL, NN and PP contained the phenolic cashew nut oil resin as well as the hexamethoxymethylmelamine.

TABLE 11

| Material | Parts |
|---|---|
| 1st Non-Productive | |
| Cis 1,4-polyisoprene rubber | 100 |
| Carbon black | 35 |
| Processing oil | 5 |
| Zinc oxide | 5 |
| Antioxidant | 2 |
| Fatty acid | 2 |
| 2nd Non-Productive | |
| Starch | Variable (0 or 15) |
| Starch, modified | Variable (0 or 15) |

TABLE 11-continued

| Material | Parts |
|---|---|
| Hexamethoxymethylmelamine | Variable (0 or 2) |
| Phenolic cashew nut oil resin | Variable (0 or 2) |
| *Productive* | |
| Sulfur | 1.5 |
| Sulfenamide accelerator | 1 |

The Samples were vulcanized at about 150° C. for about 36 minutes and various physical properties are shown in the following Tables 12 and 12A.

TABLE 12

| Ingredients | II | JJ | KK | LL |
|---|---|---|---|---|
| Starch | 15 | 15 | 0 | 0 |
| Hydroxyethylated starch | 0 | 0 | 15 | 15 |
| Oxidized starch | 0 | 0 | 0 | 0 |
| Acid modified starch | 0 | 0 | 0 | 0 |
| Hexamethoxymethylamine | 0 | 2 | 0 | 2 |
| Phenolic cashew nut oil resin | 0 | 2 | 0 | 2 |
| Properties | | | | |
| A. Rheometer (150° C.) | | | | |
| Max. torque, MPa | 14.8 | 15.7 | 14.5 | 15.8 |
| Min. torque, MPa | 1.5 | 1.8 | 1.4 | 1.7 |
| Delta torque | 13.3 | 13.9 | 13.1 | 14.1 |
| $T_{90}$, minutes | 15.4 | 17 | 14.8 | 16.9 |
| B. Stress-Strain | | | | |
| Tensile, MPa | 18.8 | 17.6 | 18.2 | 18.3 |
| Elongation (%) | 562 | 540 | 558 | 549 |
| Modulus (300%), MPa | 6.5 | 7.1 | 6.4 | 7.2 |
| C. Rebound, 100° C., % | 70 | 64 | 69 | 65 |
| D. Hardness, Shore A, 100° C. | 53 | 54 | 52 | 54 |
| E. Tear Strength, N, 95° C. | 75 | 92 | 74 | 104 |
| F. DIN abrasion | 207 | 211 | 210 | 207 |

TABLE 12A (a Continuation of Table 12)

| Ingredients | MM | NN | OO | PP |
|---|---|---|---|---|
| Starch | 0 | 0 | 0 | 0 |
| Hydroxyethylated starch | 0 | 0 | 0 | 0 |
| Oxidized starch | 15 | 15 | 0 | 0 |
| Acid modified starch | 0 | 0 | 15 | 15 |
| Hexamethoxymethylamine | 0 | 2 | 0 | 2 |
| Phenolic cashew nut oil resin | 0 | 2 | 0 | 2 |
| Properties | | | | |
| A. Rheometer (150° C.) | | | | |
| Max. torque, MPa | 14.9 | 15.7 | 14.9 | 15.7 |
| Min. torque, MPa | 1.5 | 1.7 | 1.5 | 1.6 |
| Delta torque | 13.4 | 14 | 13.4 | 14.1 |
| $T_{90}$, minutes | 15.2 | 17.1 | 14.9 | 17.2 |
| B. Stress-Strain | | | | |
| Tensile, MPa | 16.6 | 16.4 | 18 | 17.1 |
| Elongation (%) | 536 | 533 | 550 | 530 |
| Modulus (300%), MPa | 6.3 | 6.7 | 6.5 | 7.1 |
| C. Rebound, 100° C., % | 68 | 64 | 69 | 65 |
| D. Hardness, Shore A, 100° C. | 52 | 54 | 52 | 54 |
| E. Tear Strength, N, 95° C. | 80 | 108 | 73 | 95 |
| F. DIN abrasion | 210 | 216 | 212 | 210 |

It can readily be seen from Tables 12 and 12A that the combination so hexamethoxymethyl melamine and the phenolic cashew nut oil resin resulted in improved tar resistance when used with the unmodified corn oil starch (Sample JJ) or modified starches (Samples LL, NN and PP).

EXAMPLE VII

In this Example, a starch composite is evaluated as a filler in combination with carbon black. Two control compounds, one containing only carbon black as the filler and the other contains carbon black and silica with a coupling agent. A comparison of the addition of coupling agent, hexamethoxymethylmelamine, or phenolic cashew nut oil resin to the starch/plasticizer composite or the hexamethoxymethylmelamine and phenolic cashew nut oil resin is also included.

The rubber samples were prepared using the rubber compositions shown in Table 13 in which, for the second non-productive mix stage, the carbon black, silica, coupling agent, starch/plasticizer composite, hexamethoxymethylmelamine and phenolic cashew nut oil resin are shown as being variable. In table 14 and 14A, the variable amounts of the ingredients for the second non-productive mix stage are shown as well as various cured properties of the resulting rubber compositions.

The individual rubber samples are shown in Tables 14 and 14A as Samples QQ to WW; wherein all of the samples contained carbon black, and variable amounts of silica, starch/plasticizer composite, coupling agents and methylene donors and acceptors.

TABLE 13

| Material | Parts |
|---|---|
| *1st Non-Productive* | |
| Cis 1,4-polyisoprene rubber | 100 |
| Carbon black | 35 |
| Processing oil | 5 |
| Zinc oxide | 5 |
| Antioxidant | 2 |
| Fatty acid | 2 |
| *2nd Non-Productive* | |
| Carbon black | Variable (0 or 15) |
| Silica | Variable (0 or 15) |
| Coupling agent | Variable (0 or 3) |
| Starch composite | Variable (0 or 15) |
| Hexamethoxymethylmelamine | Variable (0 or 2) |
| Phenolic cashew nut oil resin | Variable (0 or 2) |
| *Productive* | |
| Sulfur | 1.5 |
| Sulfenamide accelerator | 1 |

The Samples were vulcanized at about 150° C. for about 36 minutes and various physical properties are shown in Tables 14 and 14A.

TABLE 14

| Ingredients | QQ | RR | SS | TT |
|---|---|---|---|---|
| Carbon black | 50 | 35 | 35 | 35 |
| Silica | 0 | 15 | 0 | 0 |
| Coupling agent | 0 | 3 | 0 | 3 |
| Starch composite | 0 | 0 | 15 | 15 |
| Hexamethoxymethylmelamine | 0 | 0 | 0 | 0 |
| Phenolic cashew nut oil | 0 | 0 | 0 | 0 |

TABLE 14-continued

| Ingredients | QQ | RR | SS | TT |
|---|---|---|---|---|
| resin | | | | |
| Properties | | | | |
| A. Rheometer (150° C.) | | | | |
| Max. torque, MPa | 18.5 | 14.0 | 14.8 | 14.4 |
| Min. torque, MPa | 2.2 | 1.7 | 1.8 | 1.6 |
| Delta torque | 16.3 | 12.3 | 13.0 | 12.8 |
| $T_{90}$, minutes | 14.3 | 16.7 | 14.9 | 11.8 |
| B. Stress-Strain | | | | |
| Tensile, MPa | 21.6 | 19.5 | 19.5 | 19.9 |
| Elongation (%) | 484 | 556 | 571 | 533 |
| Modulus, 300%, MPa | 11.9 | 8.2 | 7.9 | 9.6 |
| C. Rebound, 100° C., % | 62 | 60 | 62 | 63 |
| D. Hardness, Shore A, 100° C. | 58 | 53 | 55 | 56 |
| E. Tear Strength, N, 95° C. | 114 | 238 | 93 | 104 |
| F. DIN abrasion | 99 | 148 | 158 | 138 |

TABLE 14A (a Continuation of Table 14)

| Ingredients | UU | VV | WW |
|---|---|---|---|
| Carbon black | 50 | 35 | 35 |
| Silica | 0 | 0 | 0 |
| Coupling agent | 0 | 0 | 0 |
| Starch composite | 15 | 15 | 15 |
| Hexamethoxymethylmelamine | 2 | 2 | 0 |
| Phenolic cashew nut oil resin | 0 | 2 | 2 |
| Properties | | | |
| A. Rheometer (150° C.) | | | |
| Max. torque, MPa | 15.2 | 14.4 | 14.5 |
| Min. torque, MPa | 2.0 | 2.0 | 1.6 |
| Delta torque | 13.2 | 12.4 | 12.8 |
| $T_{90}$, minutes | 15.9 | 15.6 | 12.2 |
| B. Stress-Strain | | | |
| Tensile, MPa | 20.4 | 19.5 | 20.5 |
| Elongation (%) | 524 | 550 | 556 |
| Modulus, 300%, MPa | 10.0 | 9.0 | 9.1 |
| C. Rebound, 100° C., % | 60 | 62 | 63 |
| D. Hardness, Shore A, 100° C. | 57 | 54 | 56 |
| E. Tear Strength, N, 95° C. | 116 | 112 | 111 |
| F. DIN abrasion | 141 | 154 | 139 |

It can readily be seen from Tables 14 and 14A that the addition of coupling agent (Sample TT), hexamethoxymethylmelamine (Sample UU) phenolic cashew nut oil resin (Sample WW) or a combination of hexamethoxymethylmelamine and phenolic cashew nut oil resin (Sample VV) improves the abrasion resistance and tear resistance of the carbon black/starch composite rubber composition (Sample SS).

It is also apparent that the addition of selected methylene donors and/or acceptors can provide higher tear resistance than the addition of coupling agent.

EXAMPLE VIII

In this Example a starch/plasticizer composite is evaluated as a filler in combination with carbon black. The addition of coupling agent to the rubber compositions which contain carbon black and starch/plasticizer composite fillers or the combination of coupling agent with methylene donor and/or methylene acceptor are compared to the Control Sample AAA.

The rubber samples were prepared using the rubber compositions shown in Table 15 in which, for the second non-productive mix stage, the coupling agent, hexamethoxymethylmelamine and phenolic cashew nut oil resin are shown as being variables. In Table 16 the variable amounts of the ingredients for the second non-productive mix stage are shown as well as various cured properties of the rubber compositions.

TABLE 15

| Material | Parts |
|---|---|
| 1st Non-Productive | |
| Cis 1,4-polyisoprene rubber | 100 |
| Carbon black | 35 |
| Processing oil | 5 |
| Zinc oxide | 5 |
| Antioxidant | 2 |
| Fatty acid | 2 |
| 2nd Non-Productive | |
| Starch composite | 15 |
| Coupling agent | Variable (0 or 3) |
| Hexamethoxymethylmelamine | Variable (0 or 2) |
| Phenolic cashew nut oil resin | Variable (0 or 2) |
| Productive | |
| Sulfur | 1.5 |
| Sulfenamide accelerator | 1 |

The Samples are vulcanized at about 150° C. for about 36 minutes hours and various resulting physical properties are shown in Table 16.

TABLE 16

| Ingredients | AAA | BBB | CCC | DDD | EEE |
|---|---|---|---|---|---|
| Coupling agent | 0 | 3 | 3 | 3 | 3 |
| Hexamethoxymethyl-melamine | 0 | 0 | 2 | 2 | 0 |
| Phenolic cashew nut oil resin | 0 | 0 | 0 | 2 | 2 |
| Properties | | | | | |
| A. Rheometer (150° C.) | | | | | |
| Max. torque, MPa | 14.9 | 14.4 | 13.8 | 14.1 | 14.1 |
| Min. torque, MPa | 1.8 | 1.5 | 1.3 | 1.5 | 1.5 |
| Delta torque | 13.1 | 12.9 | 12.5 | 12.6 | 12.6 |
| $T_{90}$, minutes | 13.8 | 11 | 11.3 | 11.9 | 10.4 |
| B. Stress-Strain | | | | | |
| Tensile, MPa | 21.1 | 21.5 | 20.5 | 20.2 | 18.7 |
| Elongation (%) | 565 | 529 | 529 | 504 | 512 |
| Modulus, 300%, MPa | 8.7 | 10.5 | 10.2 | 10.8 | 9.5 |
| C. Rebound, 100° C., % | 66 | 69 | 67 | 64 | 61 |
| D. Hardness, Shore A, 100° C. | 56 | 57 | 54 | 56 | 58 |
| E. Tear Strength, N, 95° C. | 95 | 103 | 121 | 135 | 137 |
| F. DIN abrasion | 158 | 151 | 162 | 154 | 143 |

It can be seen from Table 16 that the addition of coupling agent to the starch/plasticizer composite (Sample BBB) is observed to improve the tear strength and abrasion resistance of the control rubber compound (Sample AAA). The addition of the coupling agent and specified methylene donors and/or acceptors (Samples CCC, DDD and EEE) is observed to provide a further improvement in tear resistance as compared to Sample BBB.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition which comprises (A) 100 parts by weight of at least one diene-based elastomer, (B) about 0.1 to about 120 phr of at least one elastomer reinforcing filler composed of (1) about 0.1 to about 120 phr of at least one starch-based material selected from at least one of starch, starch/plasticizer composite and modified starch, wherein said modified starch is selected from at least one of hydroxyethylated starch, oxidized starch and acid modified starch, and (2) zero to about 90 phr of (a) carbon black and amorphous silica, or (b) carbon black or amorphous silica, (C) optionally a coupling agent for said starch-based material and silica, if silica is used, where said coupler has a moiety reactive with the surface of said starch composite and the surface of said silica, as the case may be, and a moiety interactive with the said elastomer, and (D) at least one methylene acceptor compound and/or methylene donor compound exclusive of hexamethylene tetramine; wherein said methylene acceptor compound is selected from at least one of phenolic cashew nut oil resin, resorcinol monobenzoate and polyhydric phenoxy resin; and wherein said methylene donor compound is selcected from at least one of hexamethoxymethylmelamine, hexaethoxymethylmelamine and ethoxymethylpyridinium chloride, N,N', N"-trimethylolmelamine, N-methylolmelamine and N', N"-dimethylolmelamine.

2. The rubber composition of claim 1 wherein said rubber composition contains both a methylene acceptor compound and a methylene donor compound wherein said methylene acceptor compound is selected from at least one of a phenolic cashew nut oil resin, resorcinol monobenzoate and polyhydric phenoxy resin and said methylene donor compound is selected from at least one of hexamethoxymethylmelamine, hexaethoxymethylmelamine and ethoxymethylpyridinium chloride, N,N',N"-trimethyhlolmelamine, N-methylolmelamine and N',N"-dimethylolmelamine.

3. The rubber composition of claim 1 wherein said starch based material is starch composed of amylose units and amylopectin units in a ratio of about 15/85 to about 35/65 and has a softening point according to ASTM No. D1228 in a range of about 180° C. to about 220° C.

4. The rubber composition of claim 1 wherein said rubber composition contains, as a phenolic cashew nut oil resin, a methylene acceptor compound.

5. The rubber composition of claim 1 wherein said rubber composition conatins a methylene donor compound selected from at least one of hexamethoxymethylmelamine, hexaethoxymethmelamine, ethoxymethylpyridinium chloride, N,N',N"-trimethylolamine, N-methylolmelamine and N', N"-dimetholomelamine.

6. The rubber composition of claim 4 wherein said starch based material is starch composed of amylose units and amylopectrin units in a ratio of about 15/85 to about 35/65 and has a softening point according to ASTM No. D 1228 in a range of about 180° C. to about 220° C.

7. The rubber composition of claim 5 wherein said starch based material is strach composed of amylose units and amylopectin units in a ratio of about 15/85 to about 35/65 and has a softening point according to ASTM No. D 1228 in a range of about 180° C. to about 220° C.

8. The rubber composition of claim 1 wherein said starch based material is corn starch.

9. The rubber composition of claim 3 wherein said starch based material is corn starch.

10. The rubber composition of claim 5 wherein said starch based material is corn starch.

11. The rubber composition of claim 2 wherein said starch based material is corn starch.

12. The rubber composition of claim 1 wherein said starch based material is a starch/plasticizer composite wherein said starch/plasticizer composite has a softening point in a range of about 110° C. to about 170° C. according to ASTM No. D1228, said plasticizer is a polymeric plasticizer having a softening point of less than 160° C. selected from at least one of comprised of at least one of poly(ethylenevinyl alcohol), ethylene-vinyl acetate copolymers, ethylene-glycidal acrylate copolymers and ethylene-maleic anhydride copolymers, ethylene-vinyl alcohol copolymers, and ethylene-acetate vinyl alcohol terpolymers so long as they have a softening point lower than 160° C. and lower than the softening point of the starch and wherein the weight ratio of starch to plasticizer is in a range of about 0.5/1 to about 4/1.

13. The rubber composition of claim 4 wherein said starch based material is a starch/plasticizer composite wherein said starch/plasticizer composite has a softening point in a range of about 110° C. to about 170° C. according to ASTM No. D1228, said plasticizer is a polymeric plasticizer having a softening point of less than 160° C. selected from at least one of comprised of at least one of poly(ethylenevinyl alcohol), ethylene-vinyl acetate copolymers, ethylene-glycidal acrylate copolymers and ethylene-maleic anhydride copolymers, ethylene-vinyl alcohol copolymers, and ethylene-acetate vinyl alcohol terpolymers so long as they have a softening point lower than 160° C. and lower than the softening point of the starch and wherein the weight ratio of starch to plasticizer is in a range of about 0.5/1 to about 4/1.

14. The rubber composition of claim 2 wherein said starch based material is a starch/plasticizer composite wherein said starch/plasticizer composite has a softening point in a range of about 110° C. to about 170° C. according to ASTM No. D1228, said plasticizer is a polymeric plasticizer having a softening point of less than 160° C. selected from at least one of comprised of at least one of poly(ethylenevinyl alcohol), ethylene-vinyl acetate copolymers, ethylene-glycidal acrylate copolymers and ethylene-maleic anhydride copolymers, ethylene-vinyl alcohol copolymers, and ethylene-acetate vinyl alcohol terpolymers so long as they have a softening point lower than 160° C. and lower than the softening point of the starch and wherein the weight ratio of starch to plasticizer is in a range of about 0.5/1 to about 4/1.

15. The rubber composition of claim 5 wherein said starch based material is a starch/plasticizer composite wherein said starch/plasticizer composite has a softening point in a range of about 110° C. to about 170° C. according to ASTM No. D1228, said plasticizer is a polymeric plasticizer having a softening point of less than 160° C. selected from at least one of comprised of at least one of poly(ethylenevinyl alcohol), ethylene-vinyl acetate copolymers, ethylene-glycidal acrylate copolymers and ethylene-maleic anhydride copolymers, ethylene-vinyl alcohol copolymers, and ethylene-acetate vinyl alcohol terpolymers so long as they have a softening point lower than 160° C. and lower than the softening point of the starch and wherein the weight ratio of starch to plasticizer is in a range of about 0.5/1 to about 4/1.

16. The rubber composition of claim 1 wherein said starch based material is a modified starch selected from at least one of hydroxyethylated starch and oxidized starch wherein, for said hydroxyethylated starch, hydroxyethyl groups have been substituted for a minor portion of hydroxyl groups of the starch.

17. The rubber composition of claim 4 wherein said starch based material is a modified starch selected from at least one of hydroxyethylated starch and oxidized starch wherein, for said hydroxyethylated starch, hydroxyethyl groups have been substituted for a minor portion of hydroxyl groups of the starch.

18. The rubber composition of claim 1 which contains from about 20 to about 85 phr of reinforcing filler selected from at least one of carbon black and amorphous silica.

19. The rubber composition of claim 1 wherein a coupling agent is used and wherein said coupling agent is comprised of a bis (3-trialkoxysilylalkyl) polysulfide wherein said alkyl groups for the trialkoxy component are selected from methyl and ethyl radicals, wherein said alkyl group for said silylalkyl component is selected from ethyl, propyl and butyl radicals and wherein the polysulfide bridge contains an average of about 2.2 to about 4 connecting sulfur atoms.

20. A rubber composition of claim 1 which comprises (A) 100 parts by weight of at least one diene-based elastomer selected from at least one polymer or copolymer of isoprene and/or 1,3-butadiene and copolymer of at least one of iosprene and 1,3-butadiene with styrene, (B) about 25 to about 90 phr of at least one elastomer reinforcing filler composed of (1) about 5 to about 70 phr of at least one starch-based material selected from at least one of starch, starch/plasticizer composite having a Tg in a range of about 110° C. to about 170° C. and modified starch, wherein said modified starch is selected from at least one of hydroxyethylated starch, oxidized starch and acid modified starch, and (2) 20 to about 85 phr of carbon black and/or amorphous silica (C) a coupling agent for said starch-based material and silica where said coupler has a moiety reactive with the surface of said starch composite and the surface of said silica and a moiety interactive with the said elastomer, and (D) at least one methylene acceptor compound and/or methylene donor compound exclusive of hexamethylene tetramine;

wherein said methylene acceptor is a phenolic cashew nut oil resin and said methylene donor is selected from at least one of hexamethoxymethylmelamine, hexaethoxymethylmelamine and ethoxymethylpyridinium chloride, N,N',N"-trimethyhlolmelamine, N-methylolmelamine and N', N"-dimethylolmelamine and wherein said coupling agent is comprised of a bis (3-trialkoxysilylalkyl) polysulfide wherein said alkyl groups for the trialkoxy component are selected from methyl and ethyl radicals, wherein said alky group for said silylalkyl component is selected from ethyl, propyl and butyl radicals and wherein the polysulfide bridge contains an average of about 2.2 to about 4 connecting sulfur atoms.

* * * * *